United States Patent [19]

Gucyski et al.

[11] Patent Number: 5,896,280
[45] Date of Patent: Apr. 20, 1999

[54] FREQUENCY CONVERTER AND IMPROVED UPS EMPLOYING THE SAME

[75] Inventors: Jeff Gucyski, Huntington Beach, Calif.; Robert William Johnson, Jr., Raleigh, N.C.; Rune Lennart Jonsson, San Diego, Calif.

[73] Assignee: Exide Electronics Corporation, Raleigh, N.C.

[21] Appl. No.: 08/988,335

[22] Filed: Nov. 25, 1997

[51] Int. Cl.$^6$ .............................. H02M 3/335; H02J 7/00
[52] U.S. Cl. ........................................ 363/24; 307/66
[58] Field of Search .................. 363/24, 25; 307/64, 307/66

[56] References Cited

U.S. PATENT DOCUMENTS

| | | | |
|---|---|---|---|
| 4,638,176 | 1/1987 | Martinelli | 363/24 |
| 4,639,849 | 1/1987 | Noworolski et al. | 363/56 |
| 4,673,825 | 6/1987 | Raddi et al. | 307/66 |
| 4,780,801 | 10/1988 | Gill et al. | 363/25 |
| 4,788,451 | 11/1988 | Stoet | 363/24 |
| 4,935,861 | 6/1990 | Johnson, Jr. et al. | 363/132 |
| 4,980,812 | 12/1990 | Johnson, Jr. et al. | 363/44 |
| 5,291,383 | 3/1994 | Oughton | 363/17 |
| 5,469,098 | 11/1995 | Johnson, Jr. | 327/190 |

Primary Examiner—Matthew Nguyen
Attorney, Agent, or Firm—Myers Bigel Sibley & Sajovec

[57] ABSTRACT

An uninterruptible power supply (UPS) includes a transformer, a low voltage converter (02), a rectifier, and a high voltage inverter (01). The low voltage converter comprises a battery, a first switching device (Q3), a second switching device (Q4), and first drive circuits (41, 42). The high voltage inverter (01) includes first and second load terminals adapted to be coupled across a load in an emergency situation; an output capacitor (C); a third switching device (Q1) and a fourth switching device (Q2), and second drive circuitry (43, 44) for driving the third and fourth switching devices from conducting to non-conducting states and vice versa so as to produce a quasi-sinusoidal output voltage waveform across the load terminals.

30 Claims, 2 Drawing Sheets

5,896,280

1

FREQUENCY CONVERTER AND IMPROVED UPS EMPLOYING THE SAME

CROSS REFERENCE TO RELATED APPLICATION

The present invention is related by subject matter to application Ser. No. 08/981,125, filed on Nov. 25, 1997 herewith, titled "Novel Charger" (attorney docket EXEL-0367), which is hereby incorporated by reference.

FIELD OF THE INVENTION

The present invention relates generally to an improved frequency converter, and to an improved topology for an uninterruptible power supply (UPS) employing said improved frequency converter.

BACKGROUND OF THE INVENTION

An uninterruptible power supply is used to provide electrical power to a load during an "emergency" situation in which the main utility power is not available, e.g., because of a line fault. UPS topologies are well known. They typically employ 60 Hz voltage transformers and require bulk storage. A goal of the present invention is to eliminate the need for such 60 Hz transformers and bulk storage because of the physical size and cost of these components. A further goal of the present invention is to provide a UPS topology in which the main switching elements are connected to neutral because such referenced switches are easily controlled with the signals without employing transformers or other isolation means. Additionally, there is a need for only a single power supply for the gate drive circuits to thereby reduce complexity and cost. In addition, a goal of the present invention is to provide an improved UPS topology with a minimum parts count.

SUMMARY OF THE INVENTION

An uninterruptible power supply (UPS) in accordance with one preferred embodiment of the present invention comprises a transformer having a primary winding and a secondary winding; a low voltage converter comprising a battery providing a DC voltage, a first switching device, a second switching device, and first drive means for driving the switching devices from a conducting state to a non-conducting state and vice versa; a rectifier for converting the first AC voltage across the secondary winding to a first high DC voltage (2*V, where "V" is the desired output voltage) at the first output terminal and a second high DC voltage (−2*V) at the second output terminal; and a high voltage inverter (01) comprising an output capacitor (C) coupled to the load terminals, a third switching device (Q1) and a fourth switching device (Q2) (where Q1 and Q2 are coupled respectively to resistors R1 and R2), and second drive means (43, 44) for driving the third and fourth switching devices from conducting to non-conducting states and vice versa so as to produce a quasi-sinusoidal output voltage waveform across the load terminals when a load is coupled thereto. The output voltage is characterized by an amplitude that varies between a positive peak (V) and a negative peak (−V).

In the presently preferred embodiment of the UPS, the first drive means alternately drives the first and second switching devices from the conducting state to the non-conducting state at a carrier frequency, or second frequency (f2), in the range of, e.g., 15–25 kHz, and more specifically the second frequency is approximately 20 kHz in the exemplary embodiment. Moreover, the quasi-sinusoidal output

2 voltage waveform preferably is characterized by a fundamental, or first frequency of approximately 60 Hz, and each of the first, second, third and fourth switching devices preferably comprises a transistor. Generally, according to the present invention, the first frequency is much lower than the second frequency. The battery voltage in the preferred embodiment is approximately 12 Volts DC, and the quasi-sinusoidal output voltage varies between +160 Volts and −160 Volts.

Another aspect of the present invention provides a frequency converter that converts a pair of input voltages having one frequency into an output voltage having another frequency and appearing between an output terminal and ground. The inventive frequency converter comprises a rectifying means coupled between a pair of input terminals and having a pair of terminals for providing a rectified voltage appearing thereacross; a pair of switching means separately coupled to the rectifying means terminals and further to ground for selectively coupling the rectifying means terminals to ground; and a capacitive means coupled between the output terminal and ground for filtering the output voltage.

A presently preferred embodiment of the frequency converter also includes a generator means for providing the pair of input voltages. The generator means preferably includes a power supply means for providing a voltage having the one frequency, and a pair of electromagnetically coupled inductive means for converting the power supply means voltage into the pair of input voltages. The power supply means voltage is applied across one inductive means, and the other inductive means is coupled between the input terminals and has a tap coupled to the output terminal. In addition, the generator means includes a source means having a pair of terminals for providing a DC voltage; and a pair of second switching means for selectively applying the DC voltage to the one inductive means. The one inductive means has a pair of terminals and a second tap coupled to one source means terminal, and the second switching means are separately coupled to the inductive means terminals and to the other source means terminal. In the preferred embodiment, the other source means terminal is coupled to ground.

The presently preferred embodiment of the frequency converter also includes a generator means having a pair of terminals for providing an auxiliary voltage appearing thereacross, and a second switching means having a pair of auxiliary terminals for selectively coupling one auxiliary terminal to one generator means terminal or the output terminal and for selectively coupling the other auxiliary terminal to respectively the other generator means terminal or ground, wherein the output voltage appears across the auxiliary terminals. The other auxiliary terminal and the other generator means terminal are coupled to ground. The auxiliary voltage preferably has a frequency substantially equal to the other frequency.

Other features of the invention are disclosed below.

BRIEF DESCRIPTION OF THE DRAWINGS

FIG. 3 depicts voltage waveforms at nodes 12, 14 and 16 of the high voltage inverter section of the inventive UPS.

DETAILED DESCRIPTION OF PREFERRED EMBODIMENTS

As indicated in the above, the present invention may be explained in terms of a presently preferred embodiment in which the invention provides an improved UPS. In addition, the invention may be viewed more generally as an improved frequency converter that may be applied in other, non-UPS technologies. Therefore, the following detailed description of preferred embodiments first provides a description of the invention in terms of an improved UPS, and then considers the invention as an improved frequency converter.

UPS Description

Figure 1:
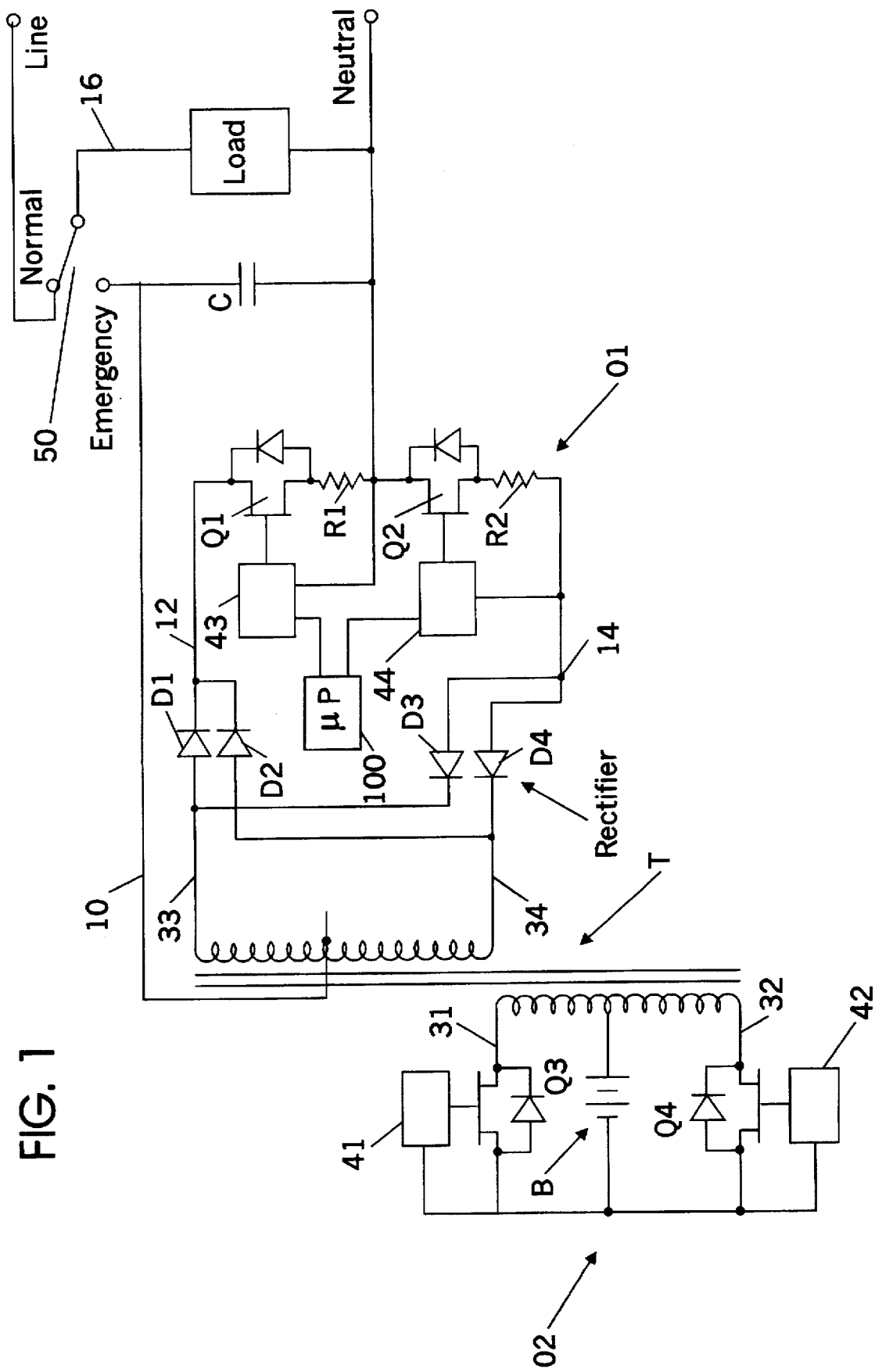
FIG. 1 schematically depicts an improved UPS topology in accordance with the present invention.

The UPS topology of the present invention departs from previous designs in a number of ways. First, the transformer (T) is not directly connected to neutral, which would make it a "stiff" voltage source, but is allowed to move with respect to the neutral depending on the state of the high voltage inverter switches, as shown in FIG. 1. The circuit is composed of three main parts. The first part 01 is the high voltage output section, also called a high voltage inverter, and comprises transistors Q1, Q2; resistors R1, R2; and gate drive circuitry 43, 44 controlled by a microprocessor 100. The gate drive circuitry 43, 44 in the presently preferred embodiment of the invention is composed of discrete components connected to the microprocessor. (Such gate drive circuitry is well known in the art, and so it will not be described in detail in this specification.) The second part 02 is the low voltage battery converter section, and it comprises a battery (B) (e.g., a 12 V battery); a pair of transistors Q3, Q4; and corresponding gate drive circuits 41, 42 (e.g., Unitrode UCC 3806 ICs). The battery converter section 02 is coupled to the high voltage inverter section 01 by the transformer and a bridge rectifier, as shown. The third part 50 is the transfer means to switch between normal and emergency operation. During normal operation, the load is connected to a utility line and during emergency operation the load is connected to the UPS. The manner in which the transfer means detects an emergency (lack of line power) and switches the load to the UPS is well known and will not be described herein. The center-tapped secondary of the transformer T is coupled by line 10 to the output capacitor (C), as shown.

Figure 2:
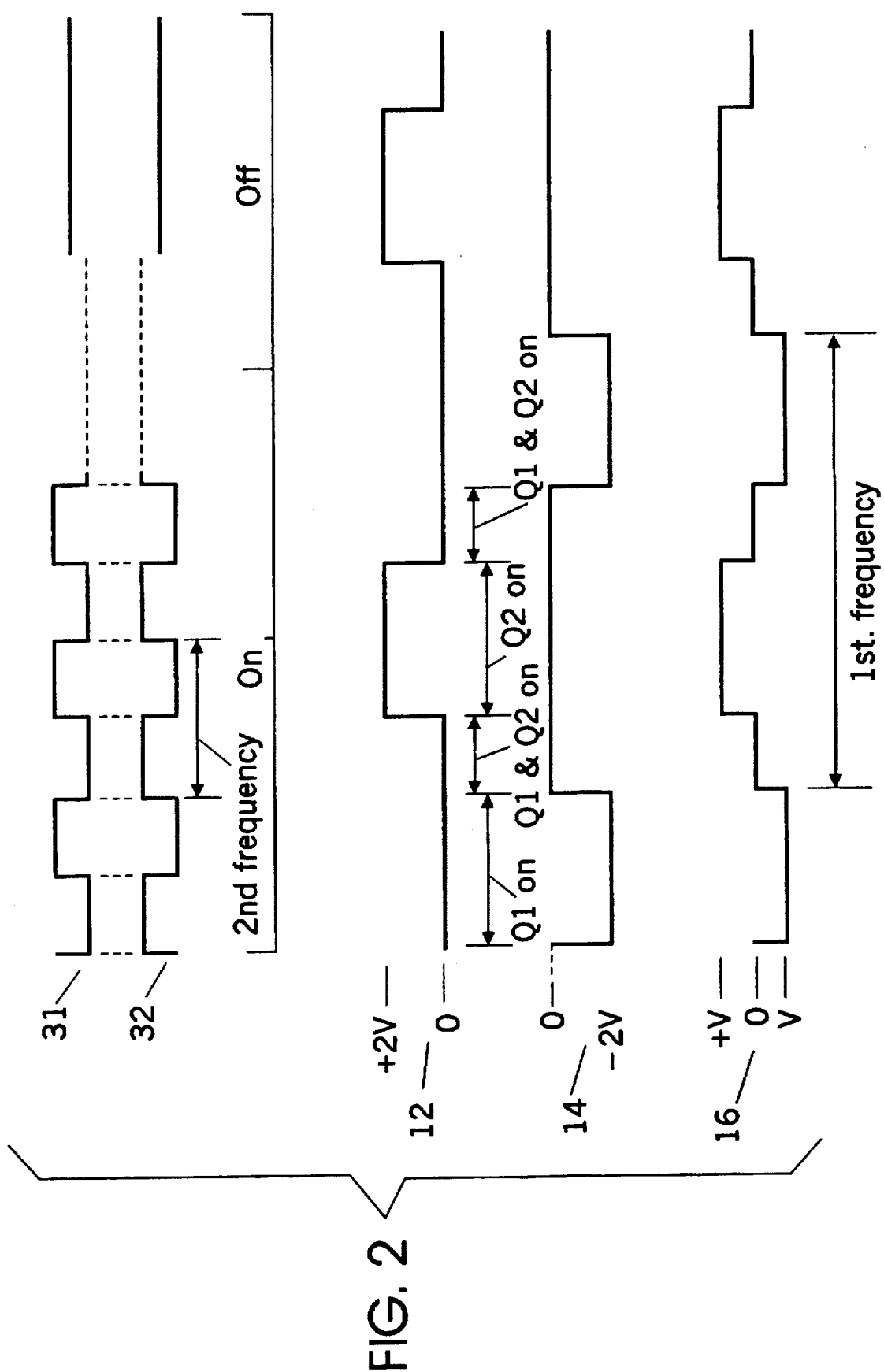
FIG. 2 depicts voltage waveforms on nodes 31 and 32 of the battery converter section of the inventive UPS.

The battery converter 02 is modulated at a frequency that is low similar to the line frequency. The modulation causes the battery converter to operate for some fraction of the period and then disables the battery converter for the rest of the cycle, as shown in FIG. 2. To produce a 60 Hz output waveform across the load, this modulation would be at a rate of 120 Hz or twice the line frequency. When the battery converter is operating, the transistors Q3 and Q4 operate in a push-pull configuration with a duty cycle of 50% during the ON portion. This operating frequency ("2nd frequency" in FIG. 1) is substantially higher than the line frequency. A typical operating frequency would be between ten times the fundamental frequency and approximately 100 kHz, and preferably 20 kHz. When the battery converter is operating, the transformer's secondary winding and rectifier will produce a DC voltage between nodes 12 and 14. This DC voltage is twice the desired output voltage "V". For example, the voltage differential between nodes 12 and 14 may be 320 Volts DC (where the desired output voltage is 160 Volts).

In the high voltage output section 01, transistors Q1 and Q2 alternately conduct to apply the DC voltage to the load. When Q1 conducts, the positive DC voltage terminal 12 is connected to neutral through resistor R1. The center tap of the high voltage winding is now at −V. This negative voltage is applied to the load node 16 for the duration of the ON period of the battery converter's operation. When the battery converter is disabled, the voltage −V is actively removed from the load by simultaneous conduction of Q1 and Q2. This effectively shorts out the load and produces a "low impedance" zero. This is necessary for inductive loads to prevent the load voltage at node 16 from uncontrolled variations. Just before the battery converter is to resume operation, the transistor Q1 is switched to a non-conductive state. When the battery converter operates this time, the negative voltage at node 14 is connected to neutral and the voltage at the center tap of the high voltage winding is at +V potential. As discussed above, this voltage is applied to the load for the duration of the battery converter operation. Again, when the battery converter is disabled, the voltage +V is actively removed to produce a "low impedance" zero voltage. This sequence of events repeats at the "first frequency" (FIG. 3) and therefore produces a quasi-square wave voltage of amplitude V across the load. The voltages described are shown in FIG. 3.

The resistors R1 and R2 offer current protection to the transistors Q1 and Q2. During the low impedance zero and the charging of the output capacitor C, currents can flow that could damage the transistors. The resistors R1 and R2 inserted in the source connections of Q1 and Q2 will reduce the gate voltage just before damaging currents flow. The reduced gate voltage will cause the transistor to operate in the linear region, resulting in limited current in the transistors.

When line voltage is sufficient to power the load directly, the battery converter section and the high voltage output section stop operation and the utility is connected directly to the load by the transfer means 50.

As mentioned, the devices Q1, Q2, Q3, and Q4 are connected to gate drive circuits 43, 44, 41 and 42. The gate drives are connected to a control circuit that is not shown. There is no battery charger implementation shown in this topology, but one is shown in the above-cited co-pending application Ser. No. 08/985,888, filed Nov. 25, 1997 and assigned to the present invention.

Frequency Converter

As discussed above, the present invention provides a frequency converter. The frequency converter converts the pair of input voltages having one frequency into an output voltage having another frequency and appearing between an output terminal and ground. The inventive frequency converter includes the rectifier (made up of diodes D1, D2, D3 and D4) coupled between "input terminals" 33 and 34, i.e., the secondary terminals of the transformer (T). The pair of terminals 12, 14 provides a rectified voltage appearing thereacross; and the pair of switching means (Q1, Q2) separately coupled to the rectifier terminals and further to ground selectively couple the rectifier terminals to ground. The capacitor C coupled between the output terminal and ground filters the output voltage. The "output voltage" of the frequency converter is measured across the capacitor C.

A "generator means," e.g., comprising transformer T and low voltage battery converter section (including the battery B, transistors Q3, Q4, and gate drive circuits 41, 42), provides the pair of input voltages to the rectifier. The generator means, therefore, may be described as including a power supply means for providing a voltage having the one frequency, and a pair of electromagnetically coupled inductive means (i.e., transformer T) for converting the power supply means voltage into the pair of frequency converter input voltages. The power supply voltage is applied across one inductive means (i.e., the primary of the transformer), and the other inductive means is coupled between the input terminals of the rectifier and has a tap coupled to the output terminal and capacitor C.

The present invention, and thus the scope of protection of the following claims, is not limited to the specific, presently preferred embodiment described above. For example, in the preferred embodiment the negative of the battery is connected to line neutral so that the number of power supplies is minimized. It is possible to connect the battery to ground and provide isolated battery controls. It is also possible to connect one terminal of the battery to neutral to achieve reduced complexity of control (preferred embodiment). Moreover, the transistor used in the presently preferred embodiment is a MOSFET that has an internal anti-parallel diode. Other devices can be used, such as an IGBT with an anti-parallel diode. Further, instead of a push-pull battery converter, one can use a bridge converter characterized by four (4) switching elements and a single primary winding instead of a center-topped winding. Still further, the output could be modulated and filtered to produce a sinewave output waveshape, and transformers with a plurality of secondary windings may be employed to produce high voltages at more than one place.

We claim:

1. A power supply comprising:

a transformer having a primary winding and a secondary winding, each of said primary and secondary windings having a first end terminal, a second end terminal and a center terminal, said center terminal of said primary winding being configured to connect to a first terminal of a DC power source, said center terminal of said secondary winding being configured to connect to a first terminal of a load;

a first inverter coupled to said first and second end terminals of said primary winding and having an input terminal configured to connect to a second terminal of the DC power source, said first inverter operative to couple alternating ones of said first and second end terminals of said primary winding to the second terminal of the DC power source to produce a first AC voltage between said first and second end terminals of said secondary winding of said transformer;

a rectifier coupled to said first and second end terminals of said secondary winding and operative to rectify the first AC voltage to produce a rectified DC voltage between a first output terminal and a second output terminal thereof; and a second inverter coupled to said first and second output terminals of said rectifier and having an output terminal configured to connect to a second terminal of the load, said second inverter operative to couple alternating ones of said first and second output terminals of said rectifier to the second terminal of the load during successive time periods at a first frequency to thereby produce a second AC voltage across the load;

wherein said first inverter is operative to decouple both of said first and second end terminals of said primary winding from the second terminal of the DC power source during periodically-occurring intervals when said second inverter switches connections between the second terminal of the load and said first and second output terminals of said rectifier.

2. A power supply according to claim 1, wherein said first inverter is operative to couple alternating ones of said first and second end terminals of said primary winding to the second terminal of the DC power source during successive time periods at a second frequency greater than said first frequency.

3. A power supply according to claim 2, wherein said second inverter is operative to couple both of said first and second output terminals of said rectifier to the second terminal of the load during said periodically-occurring intervals.

4. A power supply according to claim 3, wherein said second inverter is operative to couple both of said first and second output terminals of said rectifier to the second terminal of the load and then to decouple one of said first and second output terminals of said rectifier from the second terminal of the load before said first inverter connects one of said first and second end terminals of said primary winding to the second terminal of the DC power source during said periodically-occurring intervals.

5. A power supply according to claim 3, wherein said second frequency is less than 100 kHz.

6. A power supply according to claim 5, wherein the second AC voltage has a fundamental frequency approximately one-half of said first frequency.

7. A power supply according to claim 5, wherein the fundamental frequency of the second AC voltage is approximately 60 Hz, and wherein said second frequency is in a range from ten times said fundamental frequency to 100 kHz.

8. A power supply according to claim 3, wherein said first inverter comprises:

a first switch connected between said input terminal and said first end terminal of said primary winding, said first switch operative to couple and decouple said first end terminal of said primary winding and the second terminal of the DC power source;

a second switch connected between said input terminal and said second end of said primary winding, said second switch operative to couple and decouple said second end terminal of said primary winding and the second terminal of the DC power source; and means for controlling said first and second switches to selectively couple said first and second end terminals of said primary winding to the second terminal of the DC power source.

9. A power supply according to claim 8, wherein said first and second switches comprise respective first and second transistors.

10. A power supply according to claim 3, wherein said second inverter comprises:

a first switch connected between said first output terminal of said rectifier and said output terminal of said second inverter, said first switch operative to couple and decouple said first output terminal of said rectifier to the second terminal of the load;

a second switch connected between said second output terminal of said rectifier and said output terminal of said second inverter, said second switch operative to couple and decouple said second output terminal of said rectifier to the second terminal of the load; and means for controlling said first and second switches to selectively couple said first and second output terminals of said rectifier to the second terminal of the load.

11. A power supply according to claim 10, wherein said first and second switches comprise respective first and second transistors.

12. A power supply according to claim 1, further comprising means for coupling said first terminal of the load to one of said center terminal of said secondary winding or an external AC power supply.

13. A power supply according to claim 1, further comprising a capacitor coupled between said center terminal of said secondary winding and said output terminal of said second inverter.

14. A power supply according to claim 1, further comprising a battery coupled between said center terminal of said primary winding and said input terminal of said first inverter.

15. A power supply according to claim 1, wherein said center terminal of said primary winding is configured to couple to a line conductor of an AC power system, and wherein said second inverter is coupled to said first and second output terminals of said rectifier and has an output terminal configured to connect to a neutral conductor of the AC power system, said second inverter operative to couple alternating ones of said first and second output terminals of said rectifier to the neutral conductor of the AC power system during successive time periods at a first frequency to thereby produce the second AC voltage between the line conductor and the neutral conductor of the AC power system.

16. A power supply comprising:
a transformer having a primary winding and a secondary winding, each of said primary and secondary windings having a first end terminal, a second end terminal and a center terminal, said center terminal of said primary winding being configured to connect to a first terminal of a DC power source, said center terminal of said secondary winding being configured to connect to a line conductor of an AC power system;
a first inverter coupled to said first and second end terminals of said primary winding and having an input terminal configured to connect to a second terminal of the DC power source, said first inverter operative to couple alternating ones of said first and second end terminals of said primary winding to the second terminal of the DC power source to produce a first AC voltage between said first and second end terminals of said secondary winding of said transformer;
a rectifier coupled to said first and second end terminals of said secondary winding and operative to rectify the first AC voltage to produce a rectified DC voltage between a first output terminal and a second output terminal; and
a second inverter coupled to said first and second output terminals of said rectifier and having an output terminal configured to connect to a neutral conductor of an AC power system, said second inverter operative to couple alternating ones of said first and second output terminals of said rectifier to the neutral conductor of the AC power system during successive time periods at a first frequency to thereby produce a second AC voltage between line conductor and the neutral conductor of the AC power system.

17. A power supply according to claim 16, wherein said first inverter is operative to decouple both of said first and second end terminals of said primary winding from the second terminal of the DC power source during periodically-occurring intervals when said second inverter switches connections between the neutral conductor of the AC power system and said first and second output terminals of said rectifier.

18. A power supply according to claim 17, wherein said first inverter is operative to couple alternating ones of said first and second end terminals of said primary winding to the second terminal of the DC power source during successive time periods at a second frequency greater than said first frequency.

19. A power supply according to claim 18, wherein said second inverter is operative to couple both of said first and second output terminals of said rectifier to the neutral conductor of the AC power supply during said periodically-occurring intervals.

20. A power supply according to claim 19, wherein said second inverter is operative to couple both of said first and second output terminals of said rectifier to the neutral conductor of the AC power system and then to decouple one of said first and second output terminals of said rectifier from the neutral conductor of the AC power system before said first inverter connects one of said first and second end terminals of said primary winding to the second terminal of the DC power source during said periodically-occurring intervals.

21. A power supply according to claim 18, wherein said second frequency is less than 100 kHz.

22. A power supply according to claim 21, wherein said the second AC voltage has a fundamental frequency approximately one-half of said first frequency.

23. A power supply according to claim 21, wherein the fundamental frequency of the second AC voltage is approximately 60 Hz, and wherein said second frequency is in a range from ten times said fundamental frequency to 100 kHz.

24. A power supply according to claim 19, wherein said first inverter comprises:
a first switch connected between said input terminal and said first end terminal of said primary winding, said first switch operative to couple and decouple said first source;
a second switch connected between said input terminal and said second end of said primary winding, said second switch operative to couple and decouple said second end terminal of said primary winding and the second terminal of the DC power source; and
means for controlling said first and second switches to selectively couple said first and second end terminals of said primary winding to the second terminal of the DC power source.

25. A power supply according to claim 24, wherein said first and second switches comprise respective first and second transistors.

26. A power supply according to claim 19, wherein said second inverter comprises:
a first switch connected between said first output terminal of said rectifier and said output terminal of said second inverter, said first switch operative to couple and decouple said first output terminal of said rectifier to the neutral conductor of the AC power system;
a second switch connected between said second output terminal of said rectifier and said output terminal of said second inverter, said second switch operative to couple and decouple said second output terminal of said rectifier to the neutral conductor of the AC power system; and
means for controlling said first and second switches to selectively couple said first and second output terminals of said rectifier to the neutral conductor of the AC power system.

27. A power supply according to claim 26, wherein said first and second switches comprise respective first and second transistors.

28. A power supply according to claim 16, further comprising means for coupling the line conductor of the AC power system to one of said center terminal of said secondary winding or an external AC power supply.

29. A power supply according to claim 16, further comprising a capacitor coupled between said center terminal of said secondary winding and said output terminal of said second inverter.

30. A power supply according to claim 16, further comprising a battery coupled between said center terminal of said primary winding and said input terminal of said first inverter.

* * * * *

UNITED STATES PATENT AND TRADEMARK OFFICE
CERTIFICATE OF CORRRECTION

PATENT NO. : 5,896,280
DATED : 4/20/99
INVENTOR(S) : Jeff Gucyski et al.

It is certified that error appears in the above-identified patent and that said Letters Patent is hereby corrected as shown below:

Title page, item [56] insert the following

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | 4 | 7 | 0 | 6 | 1 | 7 | 7 | 11/10/87 | Josephson | 363 | 24 | |
| | | 4 | 6 | 3 | 9 | 8 | 4 | 9 | 1/27/87 | Noworolski et al | 363 | 56 | |
| | | 4 | 9 | 3 | 5 | 8 | 6 | 1 | 6/19/90 | Johnson, Jr. et al | 363 | 132 | |
| | | 5 | 2 | 9 | 1 | 3 | 8 | 3 | 3/1/94 | Oughton | 363 | 17 | |
| | | 5 | 4 | 6 | 9 | 0 | 9 | 8 | 11/21/95 | Johnson, Jr. | 327 | 190 | |
| | | | | | | | | | | | | | |

FOREIGN PATENT OR PUBLISHED FOREIGN PATENT APPLICATION

| | | DOCUMENT NUMBER | | | | | | PUBLICATION DATE | COUNTRY OR PATENT OFFICE | CLASS | SUBCLASS | TRANSLATION YES | NO |
|---|---|---|---|---|---|---|---|---|---|---|---|---|---|
| | | 2 | 5 | 4 | 3 | 3 | 5 | 7 | 3/25/83 | France | | | X | |
| | | | | | | | | | | | | | |

OTHER DOCUMENTS (Including Author, Title, Date, Pertinent Pages, Etc.)

| Muroyama et al., "A Control Method for a High Frequency Link Inverter Using Cycloconverter Techniques," Intelec 89, The Eleventh International Telecommunications Energy Conference; Conference Proceedings, October 15-18, 1989, Centro Dei Congressi, Firenze, 6pgs. |

| International Search Report, PCT/US98/24750, March 4, 1999 |

Signed and Sealed this
First Day of February, 2000

Attest:

Q. TODD DICKINSON

*Attesting Officer*

*Acting Commissioner of Patents and Trademarks*

UNITED STATES PATENT AND TRADEMARK OFFICE
CERTIFICATE OF CORRECTION

PATENT NO. : 5,896,280
DATED : April 20, 1999
INVENTOR(S) : Gucyski et al.

It is certified that error appears in the above-identified patent and that said Letters Patent is hereby corrected as shown below:

Column 8, line 23, before "source;" please add -- end terminal of said primary winding and the second terminal of the DC power --

Signed and Sealed this

Fourth Day of July, 2000

Attest:

Q. TODD DICKINSON

*Attesting Officer*    *Director of Patents and Trademarks*